United States Patent [19]

Shirk

[11] 4,446,307

[45] May 1, 1984

[54] TIRE CORD ADHESIVE COMPOSITION

[75] Inventor: James E. Shirk, Mantua, N.J.

[73] Assignee: Wilmington Chemical Corporation, Wilmington, Del.

[21] Appl. No.: 349,851

[22] Filed: Feb. 18, 1982

[51] Int. Cl.³ .................. C08G 59/02; C08G 59/62
[52] U.S. Cl. ................................. 528/406; 528/110; 528/408
[58] Field of Search ................. 528/408, 406, 110

[56] References Cited

U.S. PATENT DOCUMENTS

| 3,033,803 | 5/1962 | Price et al. | 528/408 X |
| 3,547,764 | 12/1970 | Van Amerongen | 428/414 X |
| 3,705,115 | 12/1972 | Bertram et al. | 528/93 |
| 3,878,132 | 4/1975 | Bertram et al. | 528/408 X |

OTHER PUBLICATIONS

Lee et al., "Handbook of Epoxy Resins", McGraw-Hill, New York, 1967, pp. 21–38.

Primary Examiner—Earl A. Nielsen
Attorney, Agent, or Firm—Webb, Burden, Robinson & Webb

[57] ABSTRACT

A stable adhesive composition is comprised of a polyfunctional epoxide which is the reaction product of a polyglycidyl ether and a water soluble polyhydroxy compound. The polyfunctional epoxide has an epoxy equivalent weight of at least about 130 and is soluble in water at a level of up to about 5 percent by weight. A catalyst is present in the adhesive composition at a level of up to about 0.8 percent by weight as triethylamine.

12 Claims, No Drawings

TIRE CORD ADHESIVE COMPOSITION

BACKGROUND OF THE INVENTION

1. Field of the Invention

This invention relates to tire cord adhesive compositions, and more particularly, to a tire cord adhesive composition for coating polyamide fibers.

2. Description of the Prior Art

It has long been recognized that polyester and polyamide fibers make an ideal reinforcement for automobile tires, rubber timing belts, and other elastomeric products.

Among these polyester and polyamide fibers are rayon, nylon and the like, and more recently, Kevlar, which is a polyaramide fiber sold by the du Pont de Nemours Company, has been found to be useful as a reinforcing fiber. These fibers have the requisite tensile and elongation properties which make them ideal for embedding in an elastomeric matrix for producing reinforced elastomeric materials.

The reinforcing effectiveness of a particular fiber is dependent not only upon the physical properties of the fiber but the degree to which the surface of the fiber adheres to the elastomeric matrix. While it is recognized that mechanically bonded fiber to elastomer has some effectiveness in providing an adequate reinforced product, far superior results are achieved by establishing a chemical bond between the fiber and the elastomeric matrix.

The organic fibers, such as the polyester, polyamide and polyaramide fibers, have new functional groups on the surface thereof which are both capable and available for reaction with the eastomeric matrix during the vulcanization process. Therefore, it has been the practice in the tire building industry to coat the fibers with a size, and more preferably a coating composition, which is reactive with both the surface of the fiber and the elastomeric matrix to form an adhesive bridge chemically binding the fiber to the elastomeric matrix. The adhesive composition, by forming this chemical bond, provides a reinforced elastomeric article with a high degree of strength which takes the full benefit of the physical properties of the fiber and imparts them to the final article.

In the particular case of the polyaramide fiber, i.e. Kevlar, it has been found that the triglycidyl ether of glycerol has been useful in providing adhesion between the fiber and the elastomeric matrix. It is theorized that the high epoxide functionality of this material yields reactive sites which readily interact with both the fiber and the elastomer. In addition, the triglycidyl ether of glycerol has the advantage of having a certain degree of water solubility so that when dissolved and/or dispersed in water it will readily wet the surface of highly polar polyamide of polyaramide fiber.

While the triglycidyl ether of glycerol has been found to be useful as a tire cord adhesive composition, i.e. a fiber coating composition, it is both expensive and difficult to manufacture. Thus, those skilled in the art have attempted to find an economic substitute for the triglycidyl ether of glycerol which is easily produced from relatively inexpensive raw materials while enhancing the performance of the composition and providing superior reinforced elastomeric articles.

In accordance with the present invention, a tire cord adhesive is provided which is economical to manufacture, which is easily produced and which imparts the requisite adhesion between the reinforcing fiber and the elastomeric matrix.

Further, in accordance with the present invention, a tire cord adhesive composition is provided which has the requisite degree of water solubility for ease of application to the reinforcing fiber.

BRIEF DESCRIPTION OF THE INVENTION

A stable adhesive composition is comprised of a polyfunctional epoxide which is the reaction product of a polyglycidyl ether and a water soluble polyhydroxy compound. The polyfunctional epoxide has an epoxy equivalent weight of at least about 130 and is soluble in water at a level of up to about 5 percent by weight. A catalyst is present in the adhesive composition at a level of up to about 0.8 percent by weight as triethylamine.

DETAILED DESCRIPTION OF THE INVENTION

The polyglycidyl ethers useful in the practice of the invention are those glycidyl ethers having a functionality of 2 or more and typically having an equivalent weight per epoxide greater than 90, and preferably greater than 100. The polyglycidyl ether is typically of low molecular weight and is somewhat hydrophilic in nature but usually not water soluble to any appreciable extent. The polyglycidyl ether provides epoxy functionality to the adhesive composition in order that the adhesive composition is reactive with the particular riber and elastomeric matrix making up the product to be manufactured.

Typical polyglycidyl ethers useful in the practice of the invention are the diepoxides such the diglycidyl ether of a low molecular weight alkylene diol. Exemplary of such low molecular weight alkylene diols are ethylene glycol, propylene glycol, butanediol, pentanediol, hexanediol and the like. In addition to the diglycidyl ether of alkylene diols, polyoxyethylene and polyoxypropylene diols, which have been epoxidized through the well known epichlorohydrin epoxidation process, may also be used. These polyoxyalkylated diols which have been epoxidized are in some instances desirable since the ether groups from oxyalkylation impart hydrophilicity to the epoxides. Preferably, the polyglycidyl ether has a molecular weight between 250 and 550, and an equivalent weight between 145 and 175.

The water soluble polyhydroxy compounds useful in the practice of the invention are those polyhydroxy compounds having at least 2 hydroxyl groups. Preferably, the polyhydroxy compound has a molecular weight between 90 and 190, and an equivalent weight between 30 and 90. Preferably, the polyhydroxy compounds are of low molecular weight and have at least 3 hydroxyl groups. Typical water soluble polyhydroxy compounds useful in the practice of the invention are glycerol, sorbitol, diethylene glycol, dipropylene glycol and the like. It has been found that glycerol is particularly useful as a water soluble polhydroxy compound in the context of the invention.

In forming the polyfunctional epoxide adhesive composition of the invention, the polyfunctional epoxide is formed by reacting the polglycidyl ether and the water soluble polyhydroxy compound at a stoichiometry of about 2.5 to 4 equivalents of epoxide functionality attributable to the polyglycidyl ether to 1 equivalent of polyhydroxy compound, and more preferably at a stoichiometric ratio of 3 to 3.5 equivalents of epoxy to 1 equivalent of polyhydroxy compound. Thus, it is readily apparent that there are a substantial amount of free epoxy groups subsequent to the reaction of the glycidyl ether and the water soluble polyhydroxy compound.

The reaction is controlled so as to leave residual polyhydroxy compounds in the adhesive composition while having some of the polyhydroxy compound partially reacted with the polyglycidyl ether, thus forming a mono- or diepoxide, with the same compound having a plurality of free hydroxyl groups, both attributable to the polyhydroxy compound itself and the reaction product of the epoxy with the hydroxyls. In addition, there is also remaining in the adhesive unreacted polyglycidyl ether.

Thus, the adhesive composition prepared in accordance with the invention is typically a homogeneous solution of the polyglycidyl ether, the polyhydroxy compound, and partial reaction products of the two. The free polyhydroxy compound and the partially reacted polyhydroxy compound act as a linking solvent to enable the adhesive composition to be soluble in water at a level up to about 5 percent by weight. More typically, the adhesive composition is soluble in water at a level of 1 to 5 percent by weight. The limited water solubility allows for ease of application to the reinforcing fiber and additionally provides a water insensitive final composition upon curing.

The polyfunctional epoxide is formed in the presence of a suitable catalyst which promotes the reaction of the hydroxyls of the polyhydroxy compound with the epoxies of the polyglycidyl ether. Typical catalysts are the tertiary amines, the quaternary ammonium salts and the quaternary phosphonium salts. It has been found that it is necessary to use tertiary amines as opposed to primary or secondary amines because the primary or secondary amines are too active and cause interpolymerization of the polyglycidyl ether, and hence gelation.

The tertiary amines useful in the practice of the invention are the trialkylamines such as trimethylamine, triethylamine, N-ethylmorpholine, dimethylaminoethanol, benzyldimethylamine and the like. The quaternary ammonium salts useful in the practice of the invention are benzyltrimethylammonium hydroxide, benzyltrimethylammonium chloride and the like. The quaternary phosphonium salts useful in the practice of the invention are triphenylphosphonium chloride and triphenylphosphonium bromide. Additionally, triphenylphosphine may be used.

At a minimum, 0.1 percent by weight of catalyst as triethylamine is necessary to accomplish the reaction of the polyglycidyl ether with the water soluble polyhydroxy compound. The triethylamine is a standard and other catalysts used at the percentage specified herein must have equivalent activity to triethylamine in the reaction and as a residual catalyst present in the adhesive composition to be hereinafter discussed.

In reacting the polyglycidyl ether with the water soluble polyhydroxyl compound, the polyhydroxy compound and polyglycidyl ether are charged to a suitable vessel and heated to between 100° to 140° C. The catalyst is added and the reaction is held at 100° to 140° C. for 1 to 3 hours. During the course of the reaction, the percent of the various constituents in the reaction mixture is determined by gas chromatography or the like. The reaction is determined to be complete when a substantial amount of the polyhydroxy compound is reacted, i.e. about 40 to 60 percent by weight, of that charged.

When the reaction is complete, it is cooled and filtered. In using the polyfunctional epoxide, it is necessary to have at least 0.5 to 0.8 percent by weight of catalyst as triethylamine in order to have a stable adhesive composition. If above 0.8 percent by weight of catalyst as triethylamine is present in the adhesive composition, it will be unstable and gel. If less than 0.5 percent by weight of catalyst as triethylamine is present in the adhesive composition, it will not adequately cure and bond the fiber to the elastomeric matrix in the final product. Thus, if 0.1 percent by weight of catalyst as triethylamine is used in the reaction, the additional catalysts must be added in order to produce an adhesive composition which provides good bond strength between the fiber and the elastomeric matrix.

The adhesive composition prepared in accordance with the invention is coated on fibers by preparing a water solution of the adhesive composition at a level of up to 5 percent, i.e. its maximum solubility, and dipping continuous fibers or strand through the bath, allowing the strand or fibers to dry, and winding the fibers on a roll or fabricating the strand into cloth for subsequent incorporation into the elastomeric matrix. Preferably, the pickup, i.e. add-on of the adhesive on a solid basis, is 0.3 to 2.5 percent based on the fiber weight, and more preferably 0.7 to 1.0 percent.

It has been found that the adhesive composition prepared in accordance with the invention causes excellent adherence between polyester or polyamide fibers used as reinforcements in elastomeric matrices.

The following examples will more fully illustrate the invention.

EXAMPLE 1

To an appropriate vessel was charged 450 parts by weight of the diglycidyl ether of 1,4-butanediol having a weight per epoxide of about 130, and 30 parts by weight glycerol. The vessel was purged with nitrogen and heated at 105° C. Two parts by weight of triethylamine was charged to the admixture with agitation and the admixture was permitted to exotherm to 110° C. The admixture was held for 1 hour at 105° C. and an additional 2 parts by weight of triethanolamine was added and the admixture was again heated for 1 hour. After the last hour, the polyfunctional epoxide so produced was cooled to room temperature and filtered. The polyfunctional epoxide had a weight per epoxy of 165, a viscosity of 70 centipoise, 2.8 percent free glycerin, 7.38 percent of the partial reaction product of glycerin and the diglycidyl ether of butanediol, with the remainder being the diglycidyl ether mix of butanediol. A 4 percent solution of the adhesive composition was made in water and the polyaramide fiber was coated therewith. The pickup (the amount of solid material add-on based on the weight of the fiber) was 6.7 percent. Strip adhesion for rubber-coated polyaramide fiber was determined by the following method. Three sheets of 50 to 55 mil rubber stock approximately 8¼ × 11 inches are placed in a mold. A 2½ inch wide strip of Holland cloth is placed at each end of the rubber slab over the top rubber sheet. Adhesive coated Kevlar cord to be tested is placed over the rubber, and additional strips of Holland cloth are placed over the cord at each end. Three similar rubber sheets are placed over the cord and the entire combination is pressed in the mold at about 100 pounds per square inch for about 25 minutes at about 300° F. to cure the rubber. The rubber cord laminate is removed from the mold and allowed to slowly cool to room temperature.

The Holland cloth is removed, separating the ends of the laminate test specimen. After setting an Instron test device for a gauge length of ½ inch to ¾ inch and calibrating the unit for a crosshead speed of 2 inches per minute, the bottom layer of rubber and the cord are placed in the top jaw, and the top layer of rubber in the bottom jaw of the test device. The Instron device is operated until a separation of 2 inches is obtained and the loading noted. The top layer of rubber is then inserted in the top jaw and the cord in the bottom jaw with the gauge length of ½ inch to ¾ inch. The Instron device is again operated until a separation of 2 inches is obtained and the loading noted. The test is repeated for the opposite end of the specimen. The two-ply adhesion for the adhesive-coated Kevlar test sample was 34 pounds at 120° C. and had a two-ply adhesion at 120° C. of 50 pounds and an H pull of 57 pounds. After the adhesive composition was aged for 4 months, it was again coated on polyaramide fiber and tested in accordance with the first test method. The adhesive-coated polyaramide fiber elastomer composition had a two-ply adhesion at 120° C. of 42 pounds and an H pull of 54 pounds.

The results of these tests are highly acceptable in the manufacture of fiber reinforced elastomers.

EXAMPLE 2

Example 1 was repeated except that benzyldimethylamine was used in place of triethylamine. The residual soluble glycerin was 3.6 percent and the percent addition product of the diglycidyl ether of butanediol and glycerol was 5.62 percent. The product had a weight per epoxide of 181. The adhesive was tested in accordance with Example 1 and comparable results were obtained.

The material gave stable performance after aging for 6 months.

Thus, the adhesive composition in accordance with the invention is effective in binding polyester, polyamide and polyaramide fibers to elastomeric matrices.

Thus, although the invention has been described with reference to specific processes and specific materials, the invention is only to be limited so far as is set forth in the accompanying claims.

I claim:
1. A stable adhesive composition comprising: a polyfunctional epoxide which is the reaction product of a polyglycidyl ether and a water soluble polyhydroxy compound, said polyfunctional epoxide having an epoxy equivalent weight of at least about 130 and being soluble in water at a level up to about 5 percent by weight and a catalyst at a level wherein the catalytic activity corresponds to that of up to about 0.5 to about 0.8 percent by weight triethylamine based on the weight of the polyfunctional epoxide.
2. The adhesive composition of claim 1 having unreacted water soluble polyhydroxy compound therein.
3. The adhesive composition of claim 2 wherein said water soluble polyhydroxy compound is present at a level of up to 4 percent by weight.
4. The adhesive composition of claim 1 wherein said water soluble polyhydroxy compound is glycerol.
5. The adhesive composition of claim 1 wherein the reaction product is formed by the admixture of about 2.5 to 4 equivalents of epoxy to 1 equivalent of polyhydroxy compound.
6. The adhesive composition of claim 5 wherein said admixture is about 3 to 3.5 equivalents of epoxy to 1 equivalent of polyhydroxy compound.
7. The adhesive composition of claim 1 wherein said polyglycidyl ether is difunctional.
8. The adhesive composition of claim 7 wherein said polyglycidyl ether is the diglycidyl ether of butanediol.
9. The adhesive composition of claim 1 wherein said catalyst is selected from the group consisting of a tertiary amine, a quaternary ammonium salt, a quaternary phosphonium salt, and triphenylphosphine.
10. The adhesive composition of claim 9 wherein said tertiary amine is triethylamine.
11. The adhesive composition of claim 9 wherein said quaternary ammonium salt is benzyltrimethylammonium chloride.
12. The adhesive composition of claim 9 wherein said catalyst is triphenylphosphine.

* * * * *

UNITED STATES PATENT AND TRADEMARK OFFICE
CERTIFICATE OF CORRECTION

PATENT NO. : 4,446,307
DATED : May 1, 1984
INVENTOR(S) : James E. Shirk

It is certified that error appears in the above-identified patent and that said Letters Patent is hereby corrected as shown below:

Column 1 Line 32 "new" should read --few--.

Column 1 Line 34 "eastomeric" should read --elastomeric--.

Column 1 Line 56 "of" should read --or--.

Column 2 Line 30 "riber" should read --fiber--.

Column 2 Line 33 After "such" insert --as--.

Column 2 Line 59 "polhydroxy" should read --polyhydroxy--.

Column 2 Line 63 "polglycidyl" should read --polyglycidyl--.

Column 3 Line 60 "polyhydroxyl" should read --polyhydroxy--.

Column 4 Line 53 "butandiol" should read --butanediol--.

Claim 1 - Column 6 Line 12 Delete --up to--.

Signed and Sealed this

Eighteenth Day of September 1984

[SEAL]

Attest:

GERALD J. MOSSINGHOFF

Attesting Officer

Commissioner of Patents and Trademarks